Figure 1:
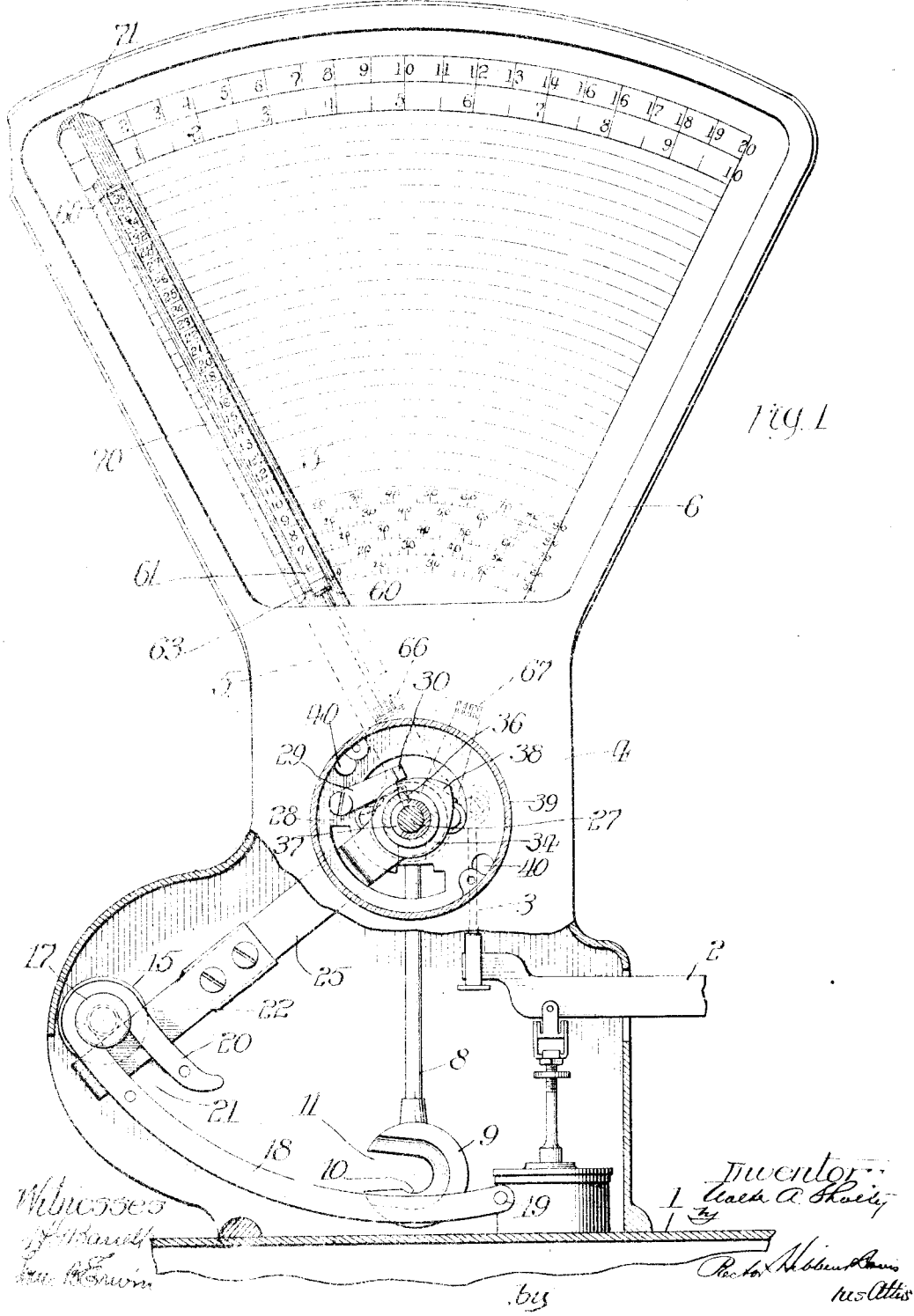

W. A. SHOLTY.
COMPUTING SCALE.
APPLICATION FILED AUG. 13, 1906.

1,201,869.

Patented Oct. 17, 1916.
3 SHEETS—SHEET 1.

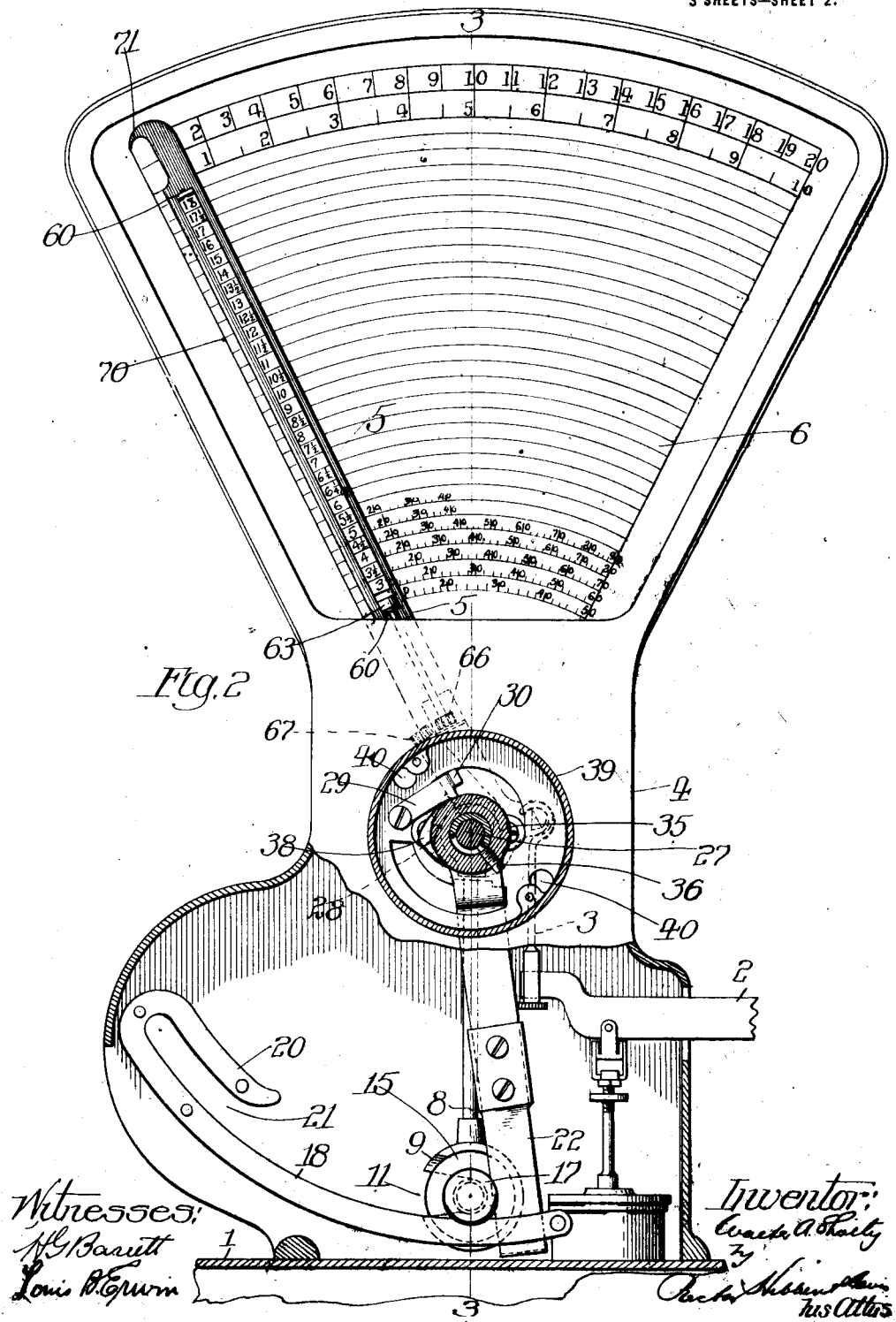

W. A. SHOLTY.
COMPUTING SCALE.
APPLICATION FILED AUG. 13, 1906.
1,201,369.
Patented Oct. 17, 1916.
3 SHEETS—SHEET 3.
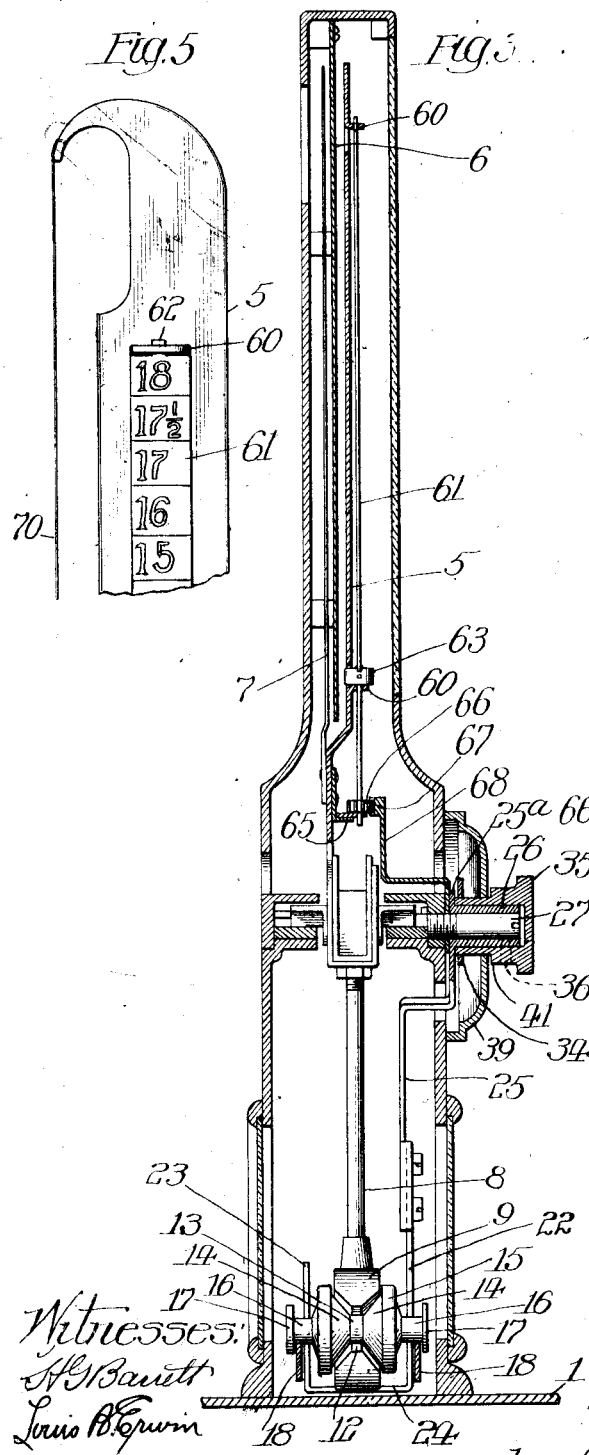

UNITED STATES PATENT OFFICE.

WALTER A. SHOLTY, OF TOLEDO, OHIO, ASSIGNOR, BY MESNE ASSIGNMENTS, TO TOLEDO SCALE COMPANY, OF NEWARK, NEW JERSEY, A CORPORATION OF NEW JERSEY.

COMPUTING-SCALE.

1,201,369.   Specification of Letters Patent.   Patented Oct. 17, 1916.

Application filed August 13, 1906. Serial No. 330,465.

*To all whom it may concern:*

Be it known that I, WALTER ALLEN SHOLTY, residing at Toledo, in the county of Lucas and State of Ohio, have invented certain new and useful Improvements in Computing-Scales, of which the following is a specification.

In computing scales of the pendulum variety it is customary to provide for augmenting the weight of the pendulum so as to increase the weighing capacity of the scales at will and in order to adapt the chart and index hand to either normal or augmented capacity it has been customary to provide two rows of weight numerals on the chart, one made up of twice as many numerals as the other, and to inscribe upon the face of the index hand two parallel rows of price numerals, each numeral of one row being paired with a numeral of twice the value in the other row. Contrasting colors are generally employed to distinguish the two rows of weight numerals from each other and the two rows of price numerals from each other. The price row representing lesser values is of course used in conjunction with the row of weight numerals representing the augmented weighing capacity of the scales and these two coöperating rows of numerals have the same color while the contrasting color is used for the row of price numerals representing the greater values and for the row of weight numerals representing the lesser or normal weight capacity of the scales. The means for augmenting the counter-balancing properties of the pendulum generally takes the form of a ball weight which may be readily applied to and removed from the pendulum and it is customary to give this ball weight the same color as the row of lesser price numerals and the row of greater capacity weight numerals. Thus when the ball weight is on the pendulum its color is that of the price and weight numerals which are to govern in reading the scales. This simple color system has been found to fully satisfy all reasonable requirements in the matter of denoting how the scales shall be read when used at one weight capacity or the other. However, in order to remove any possibility of confusion in the use of the scales by inexperienced or unusually stupid persons it is proposed by the present invention to provide for displaying only the row of price numerals of the greater values when the extra weight is off the pendulum and to display only the row of numerals of the lesser values when such weight is on the pendulum. The above described color system is preferably preserved as its efficiency has been quite extensively proven. The present invention simply aims to add a feature likely to satisfy the most hypercritical requirements by concealing from view the row or table of price numerals which is not in use thus rendering it impossible for the user, however inexperienced, stupid or careless he may be, from ignoring the price numerals whose color alone suffices for the user of ordinary intelligence. With this row of numerals only displayed of course there can be no excuse for not properly reading the scales and the opportunity for designedly misreading them is removed.

In the present embodiment of the invention the object is attained by constructing the index hand in the form of a rectangular frame and mounting thereon a strip or bar in pivotal bearings at opposite ends. The two rows of price numerals are inscribed on opposite sides of this strip or bar in contrasting colors and the strip or bar is arranged to be turned in its bearings so as to exhibit one side or the other according to whether the extra weight is on or off the pendulum. The reversal of the strip or bar is brought about automatically through coöperation with mechanism employed to control the said extra or auxiliary weight. However, the object may be attained through the employment of other forms of mechanical means and hence the following detailed description of the above indicated embodiment of the invention is not to be understood as necessarily limiting the latter to the specific devices so described and illustrated in the accompanying drawings.

Of said drawings Figures 1 and 2 represent partially in front elevation and partially in section a sufficient portion of computing scales of a well-known type to show the application of the present invention thereto, Fig. 1 illustrating the relation of parts when the extra weight is off the pendulum and Fig. 2 illustrating the changed relation when the weight is on the pendulum: Fig. 3 represents a vertical cross-section taken substantially on the line 3—3 of Fig. 2; Fig. 4 represents the index hand detached and in front elevation; Figs. 5 and 6 are fragmentary elevations of this index hand on an enlarged scale exhibiting the reverse side of the price-bar to that appearing in Fig. 4; and Figs. 7 and 8 are cross-sectional details taken on the lines 7—7 and 8—8 of Fig. 6 looking in the direction of the arrows crossing said lines, an additional part being shown in Fig. 8.

Before proceeding to describe the devices which characterize the present invention it will be desirable to set forth at some length certain mechanism for controlling the auxiliary weight, not *per se* of the present invention, prefacing the description by a brief reference to the particular type of computing scales chosen for purposes of illustration.

The particular type of computing scales to which the invention is shown as applied is that disclosed in De Vilbiss Reissue Patent No. 12,029, dated September 9, 1902, and this patent may be consulted so far as the details of construction and mode of operation of this type of scales may be concerned. It will be sufficient for the purposes of the present specification to briefly point out the principal elements going to make up scales of this character.

The reference numeral 1 designates a suitable base and 2 one end portion of the usual beam for supporting the scale pan or platter, (not shown) said beam entering a housing 4 erected on said base 1 and being connected through a link 3 with an index hand 5 which works over a computing chart 6 and has a rear portion 7 working over two rows of weight numerals on the rear side of the chart-plate. Corresponding rows of weight numerals appear on the front side of said plate just above the chart or table of computations and it is customary to inscribe them in contrasting colors. The upper row provides for double the weight capacity of the lower row and the index hand 5 ordinarily bears two vertical rows of numerals correspondingly contrasted in color and denoting prices per unit of weight, one row for use when the scales are working in one weight capacity and the other row for use when the scales are working in the other weight capacity. The index hand 5 is compounded with a pendulum 8 arranged to swing within the housing 4 and it will be understood that the different sets of weight and price numerals are to be read according to the weighting of the pendulum. The latter carries at its lower end a permanent weight 9 of disk-like form made with a radial and slightly flaring opening 11 entering one side and extending around the center of the disk concentrically therewith. The concentric portion of the side of this opening extends through more than a half circle and the lower edge of the opening beyond the concentric portion diverges from the upper edge. Thus a slight depression 10 is formed in the lower side of the radial opening at the inner end thereof, as clearly shown in Fig. 1. The portion of the weight disk 9 immediately surrounding the said radial opening is substantially V-shaped in cross-section or edge view, as illustrated in Fig. 3, although this formation is not continued to a sharp edge but terminates in a narrow, flat surface 12. The auxiliary weight takes something the shape of a dumb-bell, comprising a reduced central portion 13 of the same lateral extent as the said flat surface 12 of the permanent weight and two side portions 14 in the form of truncated cones, whose angles correspond with those of the V-shaped portions of the permanent weight, as clearly shown in Fig. 3. Beyond these side portions 14 the auxiliary weight is formed with flanges 15 designed to take over the sides of the permanent weight beyond the V-shaped portions thereof, and from the centers of the flanged heads of the auxiliary weight project trunnions 16 with flanged ends 17 for a purpose hereinafter described.

The reduced central portion 13 of the auxiliary weight resting in the depression 10 of the permanent weight insures against accidental removal of the auxiliary weight in a radial direction and the engagement of the conical portions 14 of the auxiliary weight with the V-shaped portions of the permanent weight serves to insure the auxiliary weight's properly entering the opening in the permanent weight and taking up the proper position therein. The flanges 15 also serve to prevent any possible axial displacement of the auxiliary weight.

Proceeding now to a description of the means employed for controlling the auxiliary weight, the numeral 18 designates a pair of rails mounted within the housing 4 and constituting a track upon which the auxiliary weight may travel. These rails are secured at one end in the base of the housing, as indicated at 19, on opposite sides of the pendulum somewhat beyond the limit of the latter's downward swing, and they pass the permanent pendulum weight 9 on opposite sides thereof at a level slightly below the depressed portion 10 of the opening in said weight. These rails thence curve upwardly and extend to a point beyond the limits of the upward swing of the pendulum and curving back over themselves as at 20, form guide-ways 21. The trunnions 16 of the auxiliary weight extend over these rails respectively and the flanges 17 take over the outer sides of the rails. It will be seen, therefore, that this auxiliary weight may roll up and down the track formed by said rails without danger of leaving the same and always preserved in proper position to enter and leave the opening in the permanent pendulum weight. The guideways 21 provide for the auxiliary weights being maintained in proper position at an elevated part of the track when not engaged with the permanent weight and when the scales are in use at the lower weight capacity this auxiliary weight is retained at the upper ends of said guide-ways 21, the permanent weight 9 being then free to swing through its arc without being at all influenced by the additional devices employed to change the capacity of the scales.

The auxiliary weight is moved upwardly on its track and held in its inoperative position by means of a hanger arranged to travel between the rails 18 and comprising arms 22—23 acting against the trunnions 16 and a connecting bar 24, the latter sufficiently lowered to pass underneath the permanent pendulum weight 9. The arm 22 of this bracket or hanger is secured to a pendant arm 25 which has a hub or sleeve 26 journaled upon a stud 27 fastened in the front of the housing 4 concentrically with the fulcrum of the pendulum, as shown in Fig. 3. Said arm 25 and the bracket or hanger form a unitary structure arranged to swing upon a center coincident with that of the pendulum and through a range of movement sufficient to carry the auxiliary weight entirely beyond the upward swing of the pendulum weight 9, as shown in Fig. 2, and also to leave the pendulum free as to the extent of its downward swing when carrying the auxiliary weight, as shown in Fig. 1. The upper part of the arm 25 around the sleeve 26 forms a flange 25ª which is notched at 28 for the engagement of a latch or detent 29 pivoted at one end to the housing 4 and formed at the other end with an outwardly projecting lug 30. The weight of this latch tends to lower it into engagement with the notch 28 and the latter is so located as to come into operative relation with the latch when the arm 25 is swung to the limit of its upward movement. Hence the latch constitutes means for maintaining the auxiliary weight in its inoperative position, as clearly illustrated in Fig. 1.

As a convenient means for swinging the hanger a knurled knob 35 is employed, said knob being sleeved onto the hub 26 of the arm 25 and rotatively connected therewith by means of a screw 36 entered through a tapped hole in the sleeve of the knob and projecting into a circumferential groove 37 in the hub 26, said groove extending a little short of half-way around said hub. The ends of this groove constitute shoulders against which the screw 36 may act to swing the arm 25 and its bracket or hanger one way or the other. At the inner end of the sleeve of the knob there is secured a disk 34 having a projecting cam-point 38 adapted to act against the lug 30 to displace the latch 29 and release the hanger from its elevated position.

The parts above described which are located upon the front of the housing are preferably covered by a cap piece 39 which is secured in any suitable manner to the housing, preferably by bayonet joints as shown at 40 in Fig. 1. This cap closely embraces the sleeve of the knob 35 at a reduced portion thereof, said sleeve being shouldered to overlie the cap as shown at 41 in Fig. 3.

With the scale operating at its higher weight capacity the parts will be relatively positioned as illustrated in Fig. 2, the auxiliary weight being of course upon the pendulum to augment its counter-balancing effect in the weighing of goods. The bracket or hanger has left contact with the auxiliary weight and maintains a position beyond the same so as to leave the pendulum entirely free from any counter-acting influence. The latch 29 is then simply resting upon the edge of the flange 25ª beyond the notch 28 and the latch-lifting cam-point 38 stands off to one side of the lug 30, while the screw 36 is at the right hand end of the slot 37 all as clearly shown in Fig. 2, it being understood that the knob 35 has been turned to the left. To adjust the scales for the lower weight capacity it is only necessary to turn the knob 35 to the right. The first effect will be to carry the screw 36 from one end of the slot 37 to the other, the cam-point 38 being carried past the lug 30 without any effect other than to simply raise the latch 29 and let it fall again against the edge of the notched flange. The continued turning of the knob causes the arm 25 and its bracket or hanger to be swung upwardly and thereby the auxiliary weight is carried out of the radial opening in the permanent pendulum weight and rolled up the inclined track provided by the rails 18 until this auxiliary weight passes beyond the limits of the pendulum swing, at which time the notch 28 will be brought beneath the end of the latch 29 and immediately engaged thereby, so that the hanger is automatically caught and held in its upper position and the auxiliary weight thus suspended at the upper ends of the guide-ways 21, all as clearly shown in Fig. 1.

To replace the auxiliary weight on the pendulum it is simply necessary to turn the knob to the left, which first results in causing the screw 36 to travel through the slot 37 and then as it nears the end of said slot to lift the latch 29 by reason of the action of its cam-point 38 against the lug 30. Immediately upon this taking place the arm 25 with its bracket or hanger and the auxiliary weight all fall by gravity, the said weight rolling down the inclined track and into the radial opening of the permanent pendulum weight, in which it lodges in proper position to form part of the counter-poise of the scales. In rolling into the radial opening of the permanent pendulum weight the auxiliary weight is lifted from the tracks 18 by the inclined lower edge of said radial opening and when lodged in the seat provided by the depression 10 the auxiliary weight is still removed from contact with the rails so as to swing free.

For the purposes of the present invention the index hand comprises a strip 5 which is formed throughout the greater portion of its length as a rectangular frame at the ends of which the metal is struck up as shown at 60 to form pivotal bearings for a bar 61. The latter conforms with the open center of the rectangular frame so that when either of its sides is presented outward it will have the appearance of forming an integral part of the strip. On each side or flat face of this bar there is inscribed a table or row of numerals graduated in the units of price which they represent and extending from end to end of the bar. The numerals on one side of the latter are paired with numerals on the reverse side of twice the numerical value, the latter numerals being those used when the scale is being operated at the lesser weight capacity. These numerals are preferably colored to contrast with those on the opposite side of the bar which come into play when the scales are operating in the greater weight capacity. It will be seen that when the bar faces one way exposing the row or table of price numerals on that side the other row or table or numerals is entirely concealed from view and hence the scales cannot be misread through use of the wrong row of price numerals.

At the upper end the reversible price bar is formed with a short trunnion 62 journaled in the upper bearing 60 and at the lower end the bar is fastened in a collar 63 from which projects an elongated trunnion 64 journaled in the lower bearing 60 and in an additional bearing provided by a bracket 65 secured to the strip 5 some distance below the rectangular frame portion thereof. The collar 63 carries a sector-shaped lug 63ᵃ projecting from its periphery for engagement with the outer face of the strip at one side or the other of the rectangular frame portion thereof according to which way the price bar is turned. This lug serves the purpose of limiting the rotary movement of said bar to a half-turn and insuring its taking up a position under either adjustment with one side facing squarely toward the person using the scale, thus presenting the row or table of price numerals directly to his vision. In order to accentuate the distinctness of the numerals they are preferably inscribed in colors upon a white ground and the strip 5 is darkened.

The elongated trunnion 64 has affixed to it just above the bracket-bearing a small gear wheel or pinion 66 and the price bar is turned through the engagement with said pinion of a crown segment 67 formed upon the rear side of an arm 68 forming part of the hanger structure controlling the auxiliary weight. In the present instance this arm 68 is of angular form and is secured to the flange 25ᵃ of the hanger arm 25 as shown in Fig. 3. The upwardly extending portion of said angular arm is so disposed that when the auxiliary weight is off the pendulum the segment 67 takes up a position so far to the right that the index hand may swing freely from side to side of the chart 6 without any engagement taking place between the gear wheel or pinion 66 and said segment 67, and when the auxiliary weight is on the pendulum the segment takes up a position so far to the left that no such engagement can take place. Said gear wheel is quite small and the segment correspondingly short so that a brief period of engagement between the same and the gear wheel suffices to give the latter a half-turn. When the auxiliary weight is being placed upon the pendulum the accompanying swing of the hanger structure causes the segment to intermesh with the small gear wheel, turn the same through a half rotation and then pass beyond it. Obviously the half-turn given the gear wheel in the downward swing of the hanger structure reverses the price bar so as to present to view the appropriate row or table of numerals for use while the auxiliary weight remains on the pendulum. When said weight is removed from the pendulum by upward swing of the hanger structure the segment of course reëngages the small gear wheel and turns back the price bar so as to exhibit the proper table or numerals for use when the auxiliary weight is not upon the pendulum.

To assist in locating the proper computation on the chart the index hand is narrowed throughout the extent of the rectangular frame portion and a wire or cord 70 is stretched across the narrowed portion to supply a reading line spaced from the edge of the index hand. This arrangement obviates any possible obscurity by the casting of a shadow upon the chart when the light strikes the index hand back of the edge thereof off which the reading is done. The space between the wire or cord and this edge of the hand discloses a sufficient area of the chart to the right of the reading line to enable the user to definitely and readily ascertain the exact computation whether the wire or cord intersects a numeral in the row registering with the controlling price numeral on the hand or with a graduation mark between numerals of such computation row. The wire or cord is preferably secured at its outer end to a pointer 71 formed at the outer end of the index hand to travel along the upper row of weight numerals on the chart. This outer portion of the index hand is still further narrowed so that said wire or cord may also serve to assist in locating the proper weight graduation. The said pointer extends the full width of the index hand and the space between the narrowed portion of the latter just below said pointer discloses a sufficient area of both rows of weight numerals to enable the user to definitely and readily ascertain the exact weight indicated whether the wire or cord intersects one of the numerals or a graduation mark between two of them.

While the construction above described is well calculated to thoroughly fulfil the object primarily stated it is to be understood that this construction is susceptible of modification within the scope of the invention which is not therefore limited to the details herein shown and described.

What is claimed is:

1. In apparatus of the character described, the combination with a weighing scale having means for varying the weighing capacity thereof and a computing chart or table, of an index hand including a member having a plurality of sets of price numerals so arranged that when one set is exposed to view the other set or sets are concealed, the exposed set being changed in accordance with the variations in the weighing capacity.

2. In apparatus of the character described, the combination with a weighing scale having means for varying the weighing capacity, and a computing chart or table; of an index hand comprising a member having a plurality of sets of price numerals corresponding respectively to the variations in the weighing capacity, so arranged that when one set is exposed to view the other set or sets are concealed, the exposed set being changed in accordance with the variations in the weighing capacity.

3. In apparatus of the character described, the combination with a weighing scale having means for varying the weighing capacity, and a computation chart; of an index hand compounded with the pendulum and comprising a member having a plurality of sets of price numerals so arranged that when one set is exposed to view the other set or sets are concealed, the exposed set being changed in accordance with the variations in the weighing capacity.

4. In an apparatus of the character described, the combination with a pendulum, a removable weight therefor, means for removing and replacing said weight, and a computation chart; of an index hand compounded with the pendulum and comprising a member having a plurality of sets of price numerals and means acting in conjunction with said member simultaneously with the operation of the weight removing and replacing means for alternatively exposing the one set of numerals to view while concealing the other set or sets.

5. In apparatus of the character described, the combination with the computing chart or table, of an index hand overlying the same and having a reversible bar bearing a row of price numerals on each side, weighing means connected to said hand, and means for varying the capacity of the weighing means and for reversing the bar in accordance therewith.

6. In apparatus of the character described, the combination with means for varying weighing capacity; of an index hand having a reversible bar bearing a row of price numerals on each side.

7. In apparatus of the character described, the combination with a pendulum, means for varying weighing capacity, and a computation chart; of an index hand compounded with the pendulum and having a reversible bar bearing a row of price numerals on each side.

8. In apparatus of the character described, the combination with a pendulum, a removable weight therefor, means for removing and replacing said weight and a computation chart; of an index hand compounded with the pendulum and having a reversible bar bearing a row of price numerals on each side.

9. In apparatus of the character described, the combination with a computing chart or table, of an index hand overlying the same and having a bar rotatably mounted thereon and bearing a row of price numerals on each side, weighing means connected to said hand and means for varying the capacity of the weighing means and simultaneously rotating the bar.

10. In apparatus of the character described, the combination with a computing chart or table, of an index hand overlying the same and having a bar extending lengthwise thereof and rotatably mounted thereon at opposite ends and bearing a row of price numerals on each side, weighing means connected to the hand, and means for varying the capacity of the weighing means and correspondingly rotating the bar.

11. In apparatus of the character described, the combination with a computation chart or table, of an index hand in the form of a rectangular frame overlying said chart or table, a bar extending lengthwise and centrally of said hand and rotatively mounted at opposite ends of said frame, said bar having price numerals on opposite sides, and weighing means connected to said hand and means for simultaneously varying the capacity of the weighing means and rotating the bar.

12. In apparatus of the character described, the combination with a pendulum, a removable weight therefor, a swinging carrier for said weight to remove it from or place it upon the pendulum, and a chart; of an index hand compounded with said pendulum and having a shiftable price-bearing member adapted to be actuated by said swinging weight carrier to expose different sets of numerals according as the said weight is on or off the pendulum.

13. In apparatus of the character described, the combination with a pendulum, a removable weight therefor, a swinging carrier for said weight to remove it from or place it upon the pendulum, detent devices for holding the said carrier elevated, and a chart; of an index hand compounded with said pendulum and having a shiftable price-bearing member adapted to be actuated by said swinging weight carrier to expose different sets of numerals according as the said weight is on or off the pendulum.

14. In apparatus of the character described, the combination with a pendulum, a removable weight therefor, a swinging carrier for said weight to remove it from or place it upon the pendulum, a detent for holding the said carrier elevated, a knob or handle for displacing the detent and swinging the carrier back and forth, and a chart; of an index hand compounded with said pendulum and having a shiftable price-bearing member adapted to be actuated by said swinging weight carrier to expose different sets of numerals according as the said weight is on or off the pendulum.

15. In apparatus of the character described, the combination of a casing having an inclined track or runway, a pendulum, a removable weight therefor adapted to travel upon said runway toward and away from the pendulum, a hanger swinging concentrically with the pendulum and engaging the said weight, a detent for holding the hanger elevated, a knob or handle for displacing the detent and swinging the hanger back and forth, and an index hand compounded with said pendulum, and having a shiftable price-bearing member adapted to be actuated by said hanger to expose different sets of numerals according as the said weight is on or off the pendulum.

16. In apparatus of the character described, the combination with a pendulum, a removable weight therefor, a swinging carrier for said weight to remove it from or place it upon the pendulum, and a chart; of an index hand compounded with said pendulum, and having a price-bearing bar rotatively mounted on said hand and adapted to be turned by said swinging weight carrier to expose different sets of numerals according as the said weight is on or off the pendulum.

17. In apparatus of the character described, the combination with a pendulum, a removable weight therefor, a swinging carrier for said weight to remove it from or place it upon the pendulum, detent devices for holding the said carrier elevated, and a chart; of an index hand compounded with said pendulum, and a price-bearing bar rotatively mounted on said hand and adapted to be turned by said swinging weight carrier to expose different sets of numerals according as the said weight is on or off the pendulum.

18. In apparatus of the character described, the combination with a pendulum, a removable weight therefor, a swinging carrier for said weight to remove it from or place it upon the pendulum, a detent for holding the said carrier elevated, a knob or handle for displacing the detent and swinging the carrier back and forth, and a chart; of an index hand compounded with said pendulum, and a price-bearing bar rotatively mounted on said hand and adapted to be turned by said swinging weight carrier to expose different sets of numerals according as the said weight is on or off the pendulum.

19. In apparatus of the character described, the combination of a casing having an inclined track or runway, a pendulum, a removable weight therefor adapted to travel upon said runway toward and away from the pendulum, a hanger swinging concentrically with the pendulum and engaging the said weight, a detent for holding the hanger elevated, a knob or handle for displacing the detent and swinging the hanger back and forth, an index hand compounded with said pendulum, and a price-bearing bar rotatively mounted upon said hand and adapted to be turned by said hanger to expose different sets of numerals according as the said weight is on or off the pendulum.

20. In apparatus of the character described, the combination of a chart, an index hand having a reversible price bar rotatively mounted upon it, a pendulum with which said hand is compounded, a removable weight for said pendulum, and a swinging weight carrier having an arm to act upon and pass by the said price bar; substantially as and for the purpose described.

21. In apparatus of the character described, the combination of a chart, an index hand having a reversible price-bar rotatively mounted upon it, and carrying a gear, a pendulum with which said hand is compounded, a removable weight for said pendulum; and a swinging weight-carrier having an arm to act upon and pass by the gear of said price bar; substantially as and for the purpose described.

22. In apparatus of the character described, the combination of a chart, an index hand having a reversible price bar rotatively mounted upon it, and carrying a gear wheel, a pendulum with which said hand is compounded, a removable weight for said pendulum, and a swinging weight-carrier having an arm with a segment to engage and pass by the gear wheel of said price bar; substantially as and for the purpose described.

23. In apparatus of the character described, the combination of a chart, an index hand having a reversible price bar rotatively mounted upon it, a pendulum with which said hand is compounded, a removable weight for said pendulum, a swinging weight-carrier having an arm to act upon and pass by the said price bar, and detent devices to uphold the said carrier.

24. In apparatus of the character described, the combination of a chart, an index hand having a reversible price bar rotatively mounted upon it, and carrying a gear, a pendulum with which said hand is compounded, a removable weight for said pendulum, a swinging weight-carrier having an arm to act upon and pass by the gear of said price bar and detent devices to uphold the said carrier.

25. In apparatus of the character described, the combination of a chart, an index hand having a reversible price bar rotatively mounted upon it, and carrying a gear wheel, a pendulum with which said hand is compounded, a removable weight for said pendulum, a swinging weight-carrier having an arm with a segment to engage and pass by the gear wheel of said price bar and detent devices to uphold the said carrier.

26. In apparatus of the character described, the combination of a chart, an index hand having a reversible price bar rotatively mounted upon it, a pendulum with which said hand is compounded, a removable weight for said pendulum, a swinging weight carrier having an arm to act upon and pass by the said price bar, a detent for upholding the weight-carrier, and means for displacing the detent and moving said carrier to and fro.

27. In apparatus of the character described, the combination of a chart, an index hand having a reversible price-bar rotatively mounted upon it, and carrying a gear, a pendulum with which said hand is compounded, a removable weight for said pendulum; a swinging weight-carrier having an arm to act upon and pass by the gear of said price bar, a detent for upholding the weight-carrier, and means for displacing the detent and moving said carrier to and fro.

28. In apparatus of the character described, the combination of a chart, an index hand having a reversible price bar rotatively mounted upon it, and carrying a gear wheel, a pendulum with which said hand is compounded, a removable weight for said pendulum, a swinging weight-carrier having an arm with a segment to engage and pass by the gear wheel of said price bar, a detent for upholding the weight-carrier, and means for displacing the detent and moving said carrier to and fro.

29. In apparatus of the character described, the combination of a chart, an index hand having a reversible price bar rotatively mounted upon it, a pendulum with which said hand is compounded, a removable weight for said pendulum, an inclined track or runway for said weight, a hanger swinging concentrically with the pendulum and engaging the weight and having an arm for engaging and passing by the price bar, a detent for upholding said hanger, and a knob or handle for displacing the detent and swinging the hanger.

30. In apparatus of the character described, the combination of a chart, an index hand having a reversible price bar rotatively mounted upon it and carrying a gear, a pendulum with which said hand is compounded, a removable weight for said pendulum, an inclined track or runway for said weight, a hanger swinging concentrically with the pendulum and engaging the weight and having an arm for engaging and passing by the price bar gear, a detent for upholding said hanger, and a knob or handle for displacing the detent and swinging the hanger.

31. In apparatus of the character described, the combination of a chart, an index hand having a reversible price bar rotatively mounted upon it and carrying a gear wheel, a pendulum with which said hand is compounded, a removable weight for said pendulum, an inclined track or runway for said weight, a hanger swinging concentrically with the pendulum and engaging the weight and having an arm with a segment for engaging and passing by the price bar gear wheel, a detent for upholding said hanger, and a knob or handle for displacing the detent and swinging the hanger.

32. In apparatus of the character described, a weighing scale having a computing chart, an index hand having a reversible bar bearing price numerals on opposite sides, and having a reading line spaced from one edge, means for varying the weighing capacity of the scale and simultaneously reversing the bar.

33. In apparatus of the character described, a weighing scale having a computing chart, means for varying the weighing capacity of the scale, an index hand comprising an element having a plurality of sets of price numerals with provisions for alternatively exposing one of the sets to view according to the variation in the capacity of the weighing scale, and a reading line spaced from the edge of the hand.

34. In apparatus of the character described, the combination of a weighing scale having means for varying the capacity thereof, and a chart having computation numerals and a row of weight numerals, of an index hand having a portion of reduced width extending across the area of the chart bearing computation numerals and itself bearing a row of price numerals, said index hand having an end portion further reduced in width and extending across the row of weight numerals, a pointer at the extremity of said further reduced portion partaking of the full width of the index hand and adapted to travel along said row of weight numerals, and a wire or cord extending from the tip of said pointer alongside the index hand throughout the numeral bearing portion thereof parallel with the edge of the latter, and free and unsupported intermediate its ends.

35. In apparatus of the class described, the combination with a weighing scale having a computing chart or table and means for varying the weighing capacity of the scale; of an index hand comprising an element having a plurality of sets of price numerals corresponding to the variations in the weighing capacity of the scale arranged to be alternatively exposed to view and provisions connected to a common prime mover for operating the means for varying the weighing capacity and exposing the corresponding set of price numerals to view.

36. In a device of the character described, the combination with a weighing scale having a computing chart or table; of an index hand comprising a revoluble member having a plurality of sets of indications thereon, means for varying the weighing capacity of the scale and provisions common to the capacity varying means and the revoluble member for simultaneously and correlatively operating them.

37. In apparatus of the character described, the combination with a weighing scale, having a computing chart or table, and an index member provided with a plurality of sets of price numerals for alternative use according to the varying capacity of the scale, of means for varying the weighing capacity thereof and means acting in conjunction with the capacity varying means for controlling the set of price numerals to be read.

WALTER A. SHOLTY.

Witnesses:
ALLEN DE VILBISS, Jr.,
M. L. THOMPSON.